(No Model.)
S. KETCHUM.
CHECK ROW PLANTER.
No. 435,428. Patented Sept. 2, 1890.
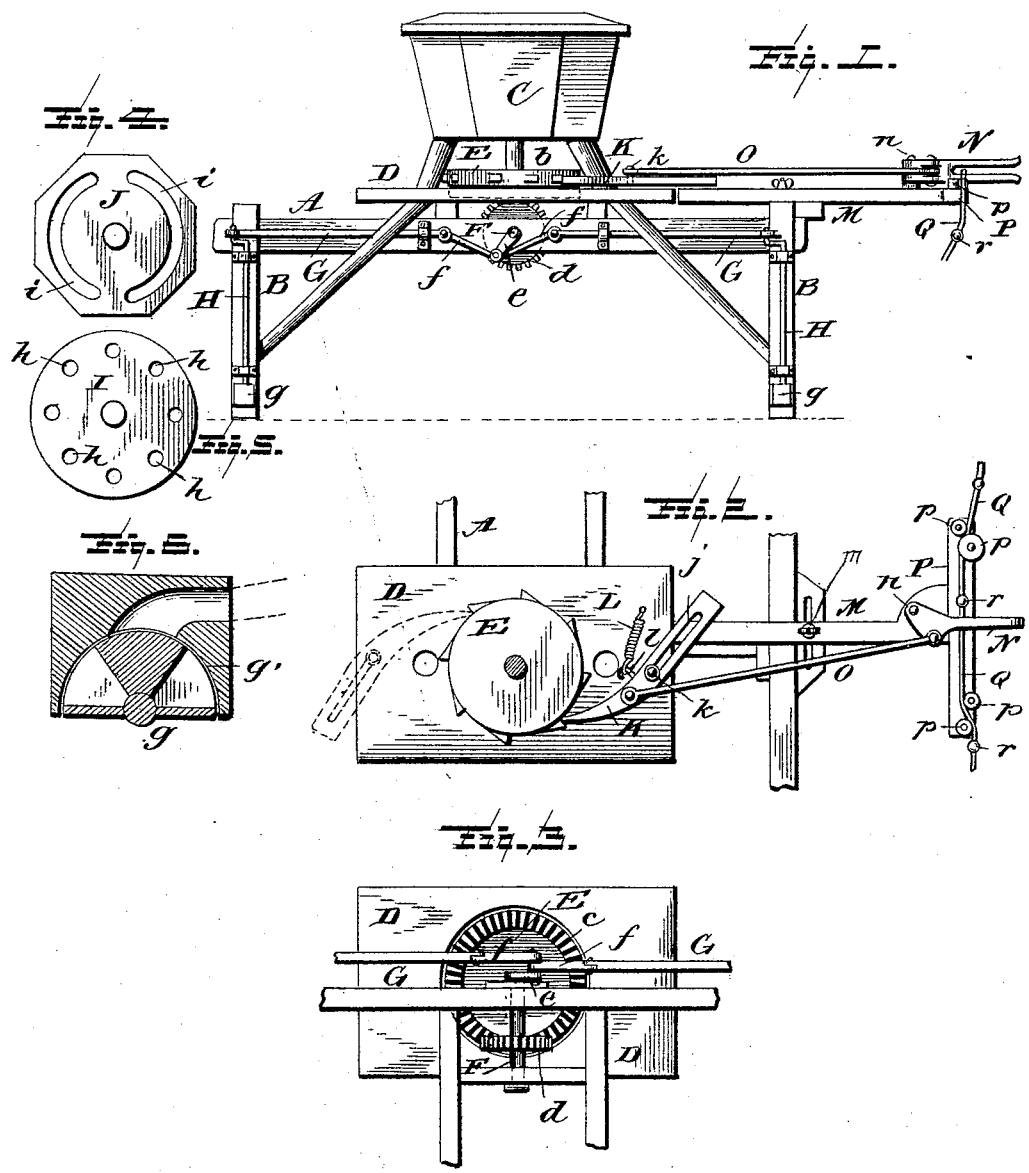
Witnesses
L. C. Hills
E. H. Bond
Inventor
Smith Ketchum,
per Chas. H. Fowler
Attorney

UNITED STATES PATENT OFFICE.

SMITH KETCHUM, OF BRIMFIELD, ILLINOIS.

CHECK-ROW PLANTER.

SPECIFICATION forming part of Letters Patent No. 435,428, dated September 2, 1890.

Application filed May 17, 1890. Serial No. 352,158. (No model.)

*To all whom it may concern:*

Be it known that I, SMITH KETCHUM, a citizen of the United States, residing in Brimfield township, in the county of Peoria and State of Illinois, have invented certain new and useful Improvements in Check-Row Planters; and I do hereby declare that the following is a full, clear, and exact description of the same, reference being had to the annexed drawings, making a part of this specification, and to the letters of reference marked thereon.

This invention relates to certain new and useful improvements in check-row corn-planters; and it has for its object to improve upon prior devices of this character.

The novelty resides in the peculiar combinations, and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a rear view of a planter constructed in accordance with my invention. Fig. 2 is a top plan of a portion of the same with hopper removed. Fig. 3 is a bottom plan. Figs. 4 and 5 are plans of the feed-plate detached and cut off. Fig. 6 is an enlarged sectional detail showing the heel of the second drop.

Like letters of reference indicate like parts throughout the several views.

Referring now to the details of the drawings by letter, A designates the frame, and B the conductors.

C is the seed-box, which may be of any desired shape, and from the said seed-box extend the spouts $a$, which communicate with the interior of the conductors, as shown best in Fig. 6, being connected thereto in any substantial manner.

D is a plate supported on the frame of the machine beneath the feed-box, and supported in bearings in this plate and within the seed-box is the vertical shaft $b$, which near its lower end carries the ratchet-wheel E, as seen best in Fig. 2. This ratchet-wheel works in a circular aperture in the plate D, and upon its under face is provided cog-teeth $c$.

F is a horizontal shaft journaled in suitable bearings in the frame of the machine and carrying the cog-wheel $d$, which is designed to mesh with the cogs on the under face of the ratchet-wheel, as shown in Fig. 3. One end of this shaft is extended beyond the frame, and is provided with a crank $e$, to which are connected the adjacent ends of the arms $f$, the other ends of which are pivotally connected with the rods G, which are arranged transversely of the frame, as shown, and guided in suitable guides thereon, the outer ends of said rods being connected with the crank ends of the vertical rods H, which are journaled in suitable bearings on the conductors, and at their lower ends are connected to the heel drop valve or gate $g$, as shown best in the enlarged view, Fig. 6, the said gate being arranged to close the discharge end of the spout until actuated to disclose the same and allow the seed to drop. In Fig. 6 the gate is shown as closing the outlet to the spout. The gate has two chambers, as shown, and an outer wall $g'$, so as to disclose the opening and discharge the seed, no matter which way the gate is oscillated, and yet prevent accidental discharge of the seed.

On the vertical shaft $b$ within the seed-box is a seed-disk I, as shown in Fig. 5, provided with openings $h$ and covered by the cut-off plate J, (see Fig. 4,) which is formed to fit the inside of the seed-box and provided with the semicircular openings $i$, placed over the seed-cells in plate I. This plate J should be provided with spring cut-offs of any preferred construction (not shown) directly over the openings in the spouts or conductors.

K are pawls, slotted, as shown at $j$, and arranged with their acting ends to actuate the ratchet-wheel, as shown, there being one upon each side of the plate D, and $k$ are pins on the said plate working in the slots of the pawls.

L are springs connected at one end to the plate and at the other end to lugs $l$ on the inner faces of the pawls, as shown best in Fig. 2.

M are arms adjustably connected to the frame by the slots and set-screws $m$, as shown in Fig. 2, for the purpose of regulating the check-row dropping by moving the said arms outward or backward.

N is a forked arm, pivoted at $n$ to the outer end of each arm M, and through which the check-row wire is designed to pass. These arms are pivotally connected with the pawls by the connecting-rods O, as shown best in Figs. 1 and 2.

P are bars rigidly secured to the outer ends of the arms M, carrying guide-rollers $p$, between which the check-row wire Q passes, the said wire being provided with buttons or the usual projections $r$.

The operation will be readily understood. The machine is drawn forward with the check-row wire placed in the slots of the arm N. As the button on the wire strikes the arm it throws it backward, forcing the rod O and the slotted pawl against the ratchet-wheel, forcing it the full length of its slot and causing the said wheel to move one notch or tooth. The length of the slot in the dog should be equal to the distance between the teeth on the ratchet-wheel. The number of cogs in the cog-wheel $d$ should be just equal to the number of cogs between two of the teeth on the cog-wheel $c$, so that each movement of the ratchet carries the pinion one-half round, throwing the crank-shaft from right to left and from left to right at every two strokes of the planter. The parts are so proportioned as to all work at the predetermined time. The springs L draw the pawls back after each stroke of the planter.

What I claim as new is—

1. The combination, with the frame and the ratchet-wheel, of the slotted pawl, the guide-pin working in the slot thereof, and the lug on one side of the pawl, the pivoted forked arm N for the check-row wire, the rod connecting the arm N with the pawl, and the spring connected to the lug on the pawl and with a fixed part of the machine, substantially as specified.

2. The combination, with the frame and the ratchet-wheel, of the adjustable arm M, the forked arm N pivoted thereon, the bar P, carried by the outer end of said arm at right angles thereto and provided with the rollers, the slotted pawl, the guide-pin therefor, the spring, and the rod connecting the pawl with the lug, substantially as specified.

3. The combination, with the frame and the ratchet-wheel provided upon its under face with teeth, of the horizontal shaft, the pinion thereon meshing with the teeth of the ratchet-wheel, the crank on the end of the shaft, the spouts, the gates at the bottom of the same, the vertical crank-rods connected with the gates, the rods connected with the said crank-shafts, and the pivoted rods connecting the crank-shaft with the said rods, as set forth.

4. The combination, with the frame and the ratchet-wheel provided with teeth upon its under face, of the plate having an opening through which the ratchet-wheel works, the horizontal shaft, the pinion thereon, the legs, the spouts communicating therewith, the gates at the lower ends of the legs, the crank on the shaft, the seed-disk, the cut-off plate, and the pivotal connections between the gates and the crank, substantially as and for the purpose specified.

5. The combination, with the frame, the seed-box, and the legs, of the spouts communicating with the legs, the gates at the lower ends of the legs formed with two chambers and outer wall each, said outer wall forming a diametrical wall for each chamber, and the pivotal connections, substantially as described, between the gates and the check-row wire, whereby the said gates are actuated through the medium of said wire, as set forth.

In testimony that I claim the above I have hereunto subscribed my name in the presence of two witnesses.

SMITH KETCHUM.

Witnesses:
J. EDSON SMITH,
W. M. VANDERVOORT.